United States Patent [19]

Iijima

[11] Patent Number: 5,065,235
[45] Date of Patent: Nov. 12, 1991

[54] CATV TERMINAL UNIT INCLUDING MEMORY FOR STORING REMOTE CONTROL CODES RELATING TO AN EXTERNAL APPARATUS

[75] Inventor: Tokuji Iijima, Tokyo, Japan

[73] Assignee: Pioneer Electronic Corporation, Tokyo, Japan

[21] Appl. No.: 478,897

[22] Filed: Feb. 12, 1990

[30] Foreign Application Priority Data

Mar. 24, 1989 [JP] Japan .................................... 1-70379

[51] Int. Cl.⁵ ........................... H04H 1/00; H04N 5/44
[52] U.S. Cl. .................................... 358/86; 358/194.1; 455/6; 455/186; 455/352; 455/4
[58] Field of Search .................. 455/3, 4, 6, 151, 181, 455/186, 352, 355, 603; 358/86, 142, 146, 147, 194.1; 340/825.57, 825.69, 825.72

[56] References Cited

U.S. PATENT DOCUMENTS

| | | | |
|---|---|---|---|
| 4,170,782 | 10/1979 | Miller | 358/84 |
| 4,488,179 | 12/1984 | Krüger et al. | 358/181 |
| 4,623,887 | 11/1986 | Welles, II | 340/825.57 |
| 4,706,121 | 11/1987 | Young | 455/181 |

Primary Examiner—Reinhard J. Eisenzopf
Assistant Examiner—Chi H. Pham
Attorney, Agent, or Firm—Sughrue, Mion, Zinn, Macpeak & Seas

[57] ABSTRACT

A CATV terminal, which has a timer function capable of supplying power to the CATV terminal at a user-programmed time, tuning-in to a user-programmed channel, and stopping the supply of power at a user-programmed time, is used to control an external apparatus such as a VCR or a TV-receiver. Remote-control codes, corresponding to functions of the external apparatus, are stored in the CATV terminal ROM. These codes are read out of the ROM, decoded, and sent to the remote-control signal receiving element of the external apparatus. Therefore, the external apparatus is controlled by the CATV terminal using the remote-control codes of the external apparatus.

3 Claims, 4 Drawing Sheets

CATV TERMINAL UNIT INCLUDING MEMORY FOR STORING REMOTE CONTROL CODES RELATING TO AN EXTERNAL APPARATUS

BACKGROUND OF THE INVENTION

The present invention relates to a CATV terminal having a timer function for turning on a power at a preset date and time and for automatically tuning in to a preset channel.

FIG. 5 is a block diagram showing a conventional example of this type of CATV terminal. In the Figure, the reference numeral 1 designates a CATV terminal and the reference numeral 2 represents a remote-control unit for remotely controlling the CATV terminal.

The CATV terminal 1 includes a microcomputer (CPU)$1a$ for controlling the operation thereof. The CPU$1a$ operates according to a preset control program. The power supply circuit $1e$ is turned on and off by operating a power switch $1b$ connected to the CPU $1a$. The CATV terminal can also be controlled by a remote-control unit 2. The remote-control unit 2 enables the user to control the CATV terminal's power supply circuit ON/OFF control, channel selection, timer function setting, and the like on the basis of a signal sent from the remote-control unit 2 to a remote-control receiving element $1c$.

In the case of the ON/OFF operation of the power by the power switch $1b$ or by sending the basis of signal from the remote unit to a remote-control receiving element $1c$, the CPU $1a$ controls a power supply circuit $1e$ supplied with an AC power, such as an AC wall outlet, through a plug $1d$. At the same time, the CPU $1a$ controls switch circuit $1f$ so as to apply the AC power to an external electric apparatus, such as VCR or TV, having a plug 3 connected to a outlet $1g$, and the AC power for the external electric apparatus and the power for the CATV terminal are simultaneously turned ON and OFF by the CPU $1a$. In the case of setting the timer function, information such as a reception channel, a date, a start (ON) time, a stop (OFF) time, and an output channel, is designated through the key operation of the remote-control unit 2 or by a keyboard (not shown) on the equipment body so that the information is inputted into the CPU $1a$, thereby being set in RAM $1h$ backed up by a back-up battery (not shown).

The CPU$1a$ turns on the power for the CATV terminal 1 at the designated ON time on the basis of the information set in the RAM $1h$, and, at the same time, the CPU $1a$ selects the designated channel and sends out a reception signal as a signal of the designated channel. Further, the CPU $1a$ turns off the power at the designated OFF time so that a series of timer operations is finished.

In the case where it is desired to record a CATV broadcast automatically by use of the timer function of the above-described conventional CATV terminal, the operation of setting a VCR timer function as well as setting the CATV terminal timer function is required. Because both timer functions must be set, there arises problems in that the two setting operations are burdensome on the user because he has to set two separate timer functions and in that the recording duration is apt to be unsynchronized with the duration of the CATV terminal activation. For example, if the internal clocks of the two devices are not perfectly synchronized, one device will turn on, and therefore turn off, before another. If the VCR turns on first, then there will be an undesired space at the beginning of the tape, and even more troublesome, the VCR will turn off before the program is finished.

Further, in the case where it is desired to perform timer-controlled TV watching by use of the timer function of the above-described conventional CATV terminal, a TV receiver, with its power button turned on, must have its plug 3 connected to the outlet $1g$ of the CATV terminal 1 so that the television receiver can be simultaneously switched on to make TV watching possible when the CATV terminal is switched on through the timer operation. There is no problem in the case where the TV receiver has a rotary tuner for performing channel selection mechanically. However, in the case where the TV receiver is of a recent type which performs the ON/OFF operation of the power, channel selection, volume adjustment, and the like, through the operation of a keyboard, the values set by the keyboard operation may be cleared or initialized when the AC power for the TV receiver is cut off. Accordingly, TV watching may become impossible when the TV receiver's AC power is directly switched on and off through the timer operation of the CATV terminal 1.

SUMMARY OF THE INVENTION

Accordingly, it is an object of the present invention to provide a CATV terminal which is designed to generate a signal necessary for operating an external apparatus related to the CATV terminal in response to the CATV terminal timer operation.

The CATV terminal of the present invention solves the aforementioned problems. The CATV terminal has a timer function for turning on a power at a preset date and time and for automatically tuning in to a preset channel to output a reception signal corresponding to the channel selected by the timer function and is characterized in that the CATV terminal further comprises: a storage means for storing remote-control codes of a usable apparatus which uses the reception signal generated corresponding t the channel selected by the timer function; a read-out means for successively reading the remote-control codes from the storage means in relation to the operation conducted by the timer function; and a remote-control signal transmission means for decoding the remote-control codes read by the read-out means into a remote-control signal capable of being received by remote-control signal receivers of the usable apparatus and for sending out the remote-control signal.

In the aforementioned configuration, the remote-control codes of the usable apparatus using the reception signal generated corresponding to the channel selected by the timer function are stored beforehand, successively read out in relation to the operation conducted by the timer function, and sent out after being decoded into a remote-control signal capable of being received by respective remote-control signal receivers of the usable apparatus. Accordingly, the operation of the usable apparatus can be controlled based on the remote-control signal sent out from the CATV terminal without changing the arrangement of the usable apparatus.

Accordingly, the necessity of setting the timer function of the usable apparatus is eliminated, so that the burdens associated with the unsynchronization of the two separate timer functions are no longer present. Furthermore, in the aforementioned configuration, the ON/OFF operation of the usable apparatus is not controlled by switching the AC power on and off, instead the ON/OFF operation of the usable apparatus is controlled based on its remote-control codes. Accordingly, the problems associated with cutting-off power to the AC power of the usable apparatus, for example, the clearing or initialization of the keyboard-set values, are also eliminated.

DESCRIPTION OF THE PREFERRED EMBODIMENTS

Figure 1:
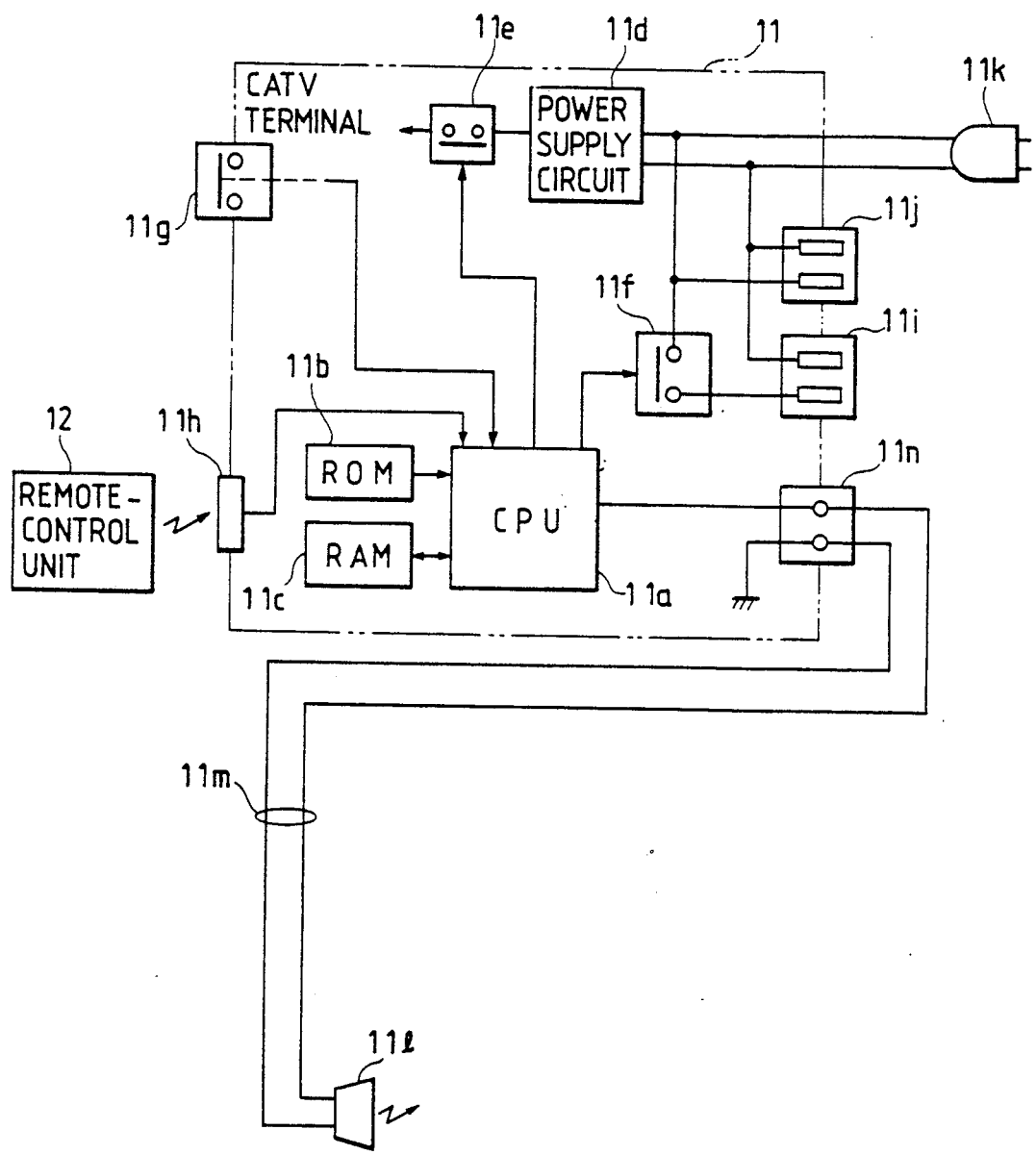
FIG. 1 is a block diagram showing an embodiment of a CATV terminal according to the present invention.

FIG. 1 is a block diagram showing an embodiment of a CATV terminal according to the present invention. In the Figure, the reference numeral 11 designates a CATV terminal, and 12 a remote-control unit for remotely controlling the CATV terminal 11. The CATV terminal 11 includes a microcomputer (CPU) 11a for controlling the operation thereof, a ROM 11b for storing therein a control program and various kinds of data, a RAM 11c for rewritably storing various kinds of data therein, a power supply circuit 11d, and switch circuits 11e and 11f. Parts, such as power switch 11g, remote-control signal receiving element 11h (for example, a light-receiving element for receiving an infrared remote-control signal emitted from the remote-control unit 12), outlets 11i and 11j for respectively feeding out switched and non-switched AC power, a plug 11k for supplying an AC power for the power supply circuit 11d, a remote-control signal output terminal 11n to which a remote-control signal transmitter 11l (for example, a light-emitting element for emitting an infrared remote-control signal) is connected through a cord 11m having a suitable length, and the like, are provided on the outer surface of a housing of the CATV terminal.

The CPU 11a operates according to the control program stored beforehand in the ROM 11b. The power supply circuit 11d is turned ON and OFF by operating a power switch 11g connected to the CPU 11a. The CATV terminal can also be controlled by a remote-control unit 12. The remote-control unit 12 enables the user to control the CATV terminal's power supply circuit ON/OFF control, channel selection, timer function setting, and the like on the basis of a signal sent from the remote-control unit 12 to a remote-control receiving element 11h.

In the case of the power supply circuit ON/OFF operation by the power switch 11g, the CPU 11a performs the ON/OFF control of the switch circuit 11e for supplying certain parts of the CATV terminal with a DC from the power supply circuit 11d which is supplied with an AC power through the plug 11k and, at the same time, the CPU 11a performs the control of the switch circuit 11f to feed / to cut AC power to the outside through the outlet 11i. In the case of setting the timer function, information such as a reception channel, a date, a start (ON) time, a stop (OFF) time, and an output channel, is designated through the key operation of the remote-control unit 12 so that the information is received by the remote-control receiving element 11h and inputted into the CPU 11a, thereby being set in the RAM 11c backed up by a back-up battery not shown.

The CPU 11a switches on the power of the CATV terminal 11 at the designated ON time of the designated date on the basis of the information set in the RAM 11c through the timer function operation, and, at the same time, the CPU 11a selects the designated channel and sends out a reception signal as a signal of the designated channel. Further, the CPU 11a switches off the power at the designated OFF time of the designated date so that a series of timer function operations is completed. Further, the CPU 11a serves to read remote-control codes (capable of being received by an external apparatus to be operated by the CATV terminal) from the ROM 11b in relation to the operation conducted by the timer function, and to feed the codes to the remote-control signal transmitter 11l connected to the remote-control signal output terminal 11n.

Figure 2:
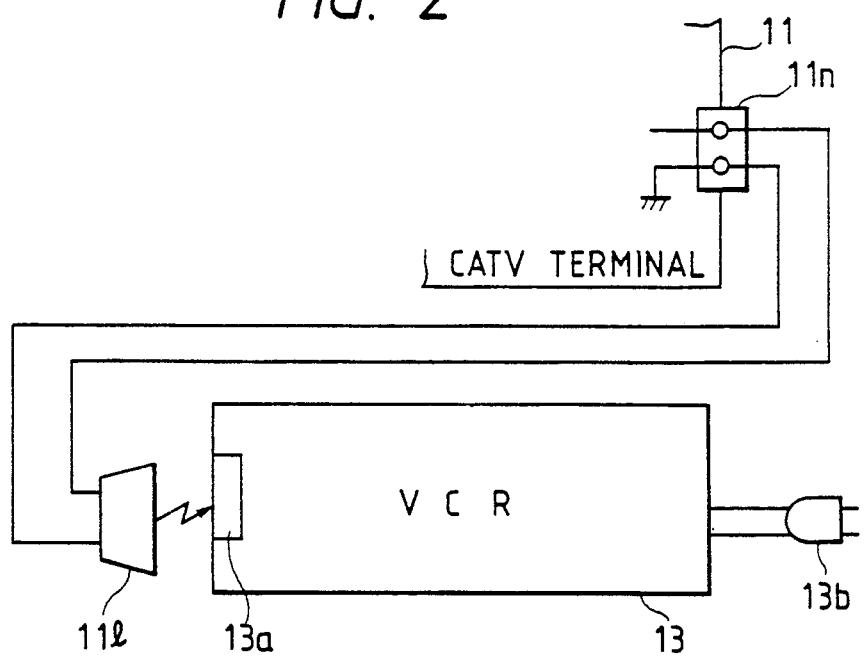
FIG. 2 is a block diagram showing an example of a configuration in which timer-controlled recording is performed by using the CATV terminal depicted in FIG. 1.

In the case where timer-controlled recording is to be performed with the use of the CATV terminal 11 configured as described above, the remote-control signal transmitter 11l is fixed by some arbitrary means (not shown) such as a sucker so that the transmitter 11l faces the remote-control signal receiving element 13a of the VCR 13 as shown in FIG. 2. The remote-control codes representing the VCR functions "POWER ON", "CH (channel)", "REC", "STOP", and "POWER OFF" necessary for operation of the VCR 13 are successively read from the ROM 11b in response to the operation conducted by the timer function, so that a remote-control signal, formed by decoding the thus read remote-control codes, is sent out from the CATV terminal 11 to the VCR 13 through the remote-control signal transmitter 11l and the remote-control signal receiving element 13a. The AC power for the VCR 13 can be activated by connecting the plug 13b into an AC wall outlet or the outlet 11j of FIG. 1 which is provided in the CATV terminal 11 to send out a non-switched AC power.

The remote-control codes including "POWER ON", "CH (channel)", "REC", "STOP", and "POWER OFF" of a plurality of different types of VCRs expected to be used in the timer-controlled recording process are stored beforehand in the ROM 11b. The individual manufacturers of the VCRs supply the appropriate remote-control codes to be written into ROM 11b. The remote-control codes of the particular VCR to be used can thus be read from the ROM 11b and sent out from the remote-control signal transmitter 11l.

Also, the invention is applicable to the case where the ROM 11b has no remote-control codes stored beforehand therein, and that, in this case, the RAM 11c may be designed to perform a learning operation to store the necessary remote-control codes based on the remote-control signal sent out from the remote-control unit used in the timer-controlled recording process.

In the aforementioned configuration, the programming of the data required to specify the details of the timer-controlled recording process in the CATV terminal 11 is performed by operating the keys of the remote-control unit 12 to designate information, such as the reception channel, the output channel, the date, the ON time, and the OFF time.

Figure 3:
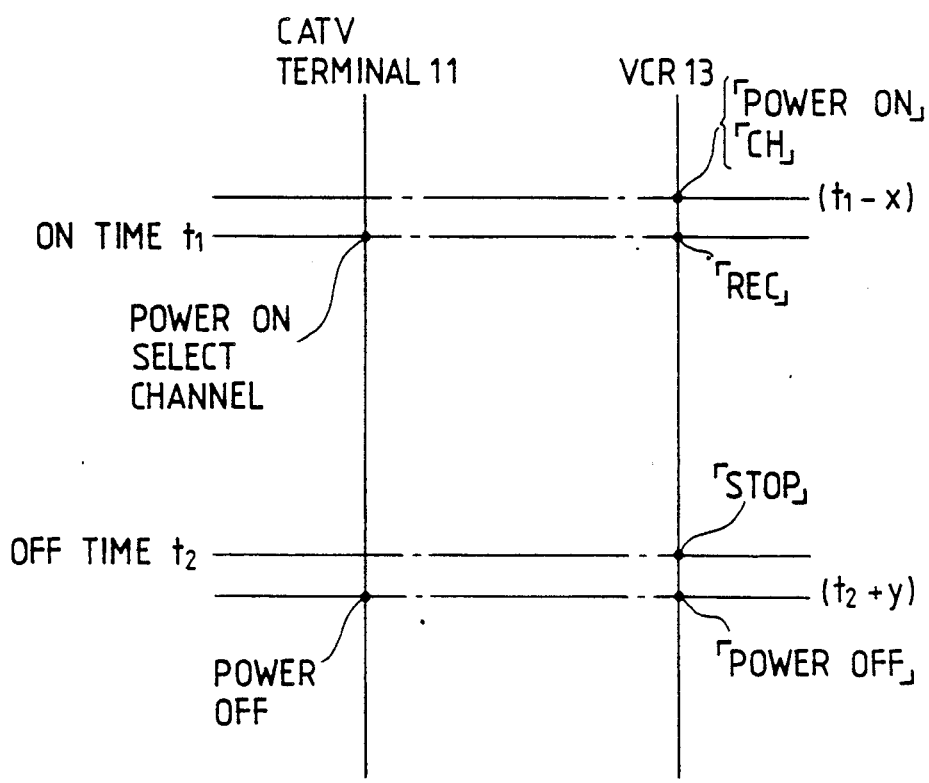
FIG. 3 is a diagram for explaining the timer-controlled recording operation carried out by the configuration depicted in FIG. 2.

Through the aforementioned process, the CATV terminal 11 sends both the remote-control code corresponding to the VCR function of "POWER ON" and the remote-control code of "CH" (for tuning in to the output channel of the CATV terminal) to the VCR 13 a predetermined time, x, before the designated ON time $t_1$ as shown in FIG. 3. Then, at the time $t_1$, the power of the CATV terminal 11 is switched on and, at the same time, the designated reception channel is selected. Further, at the same time, the remote-control code of "REC" is sent to the VCR 13 to thereby start recording.

At the OFF time $t_2$ set in the CATV terminal 11, the remote-control code of "STOP" is sent to the VCR 13 to thereby finish the recording. Then, the power of the CATV terminal 11 is switched off at a predetermined time, y, after the OFF time $t_2$ and, at the same time, the remote-control code of "POWER OFF" is sent to the VCR 13 to thereby switch off the power of the VCR 13. Thus, a series of timer-controlled recording operations is finished.

Figure 4:
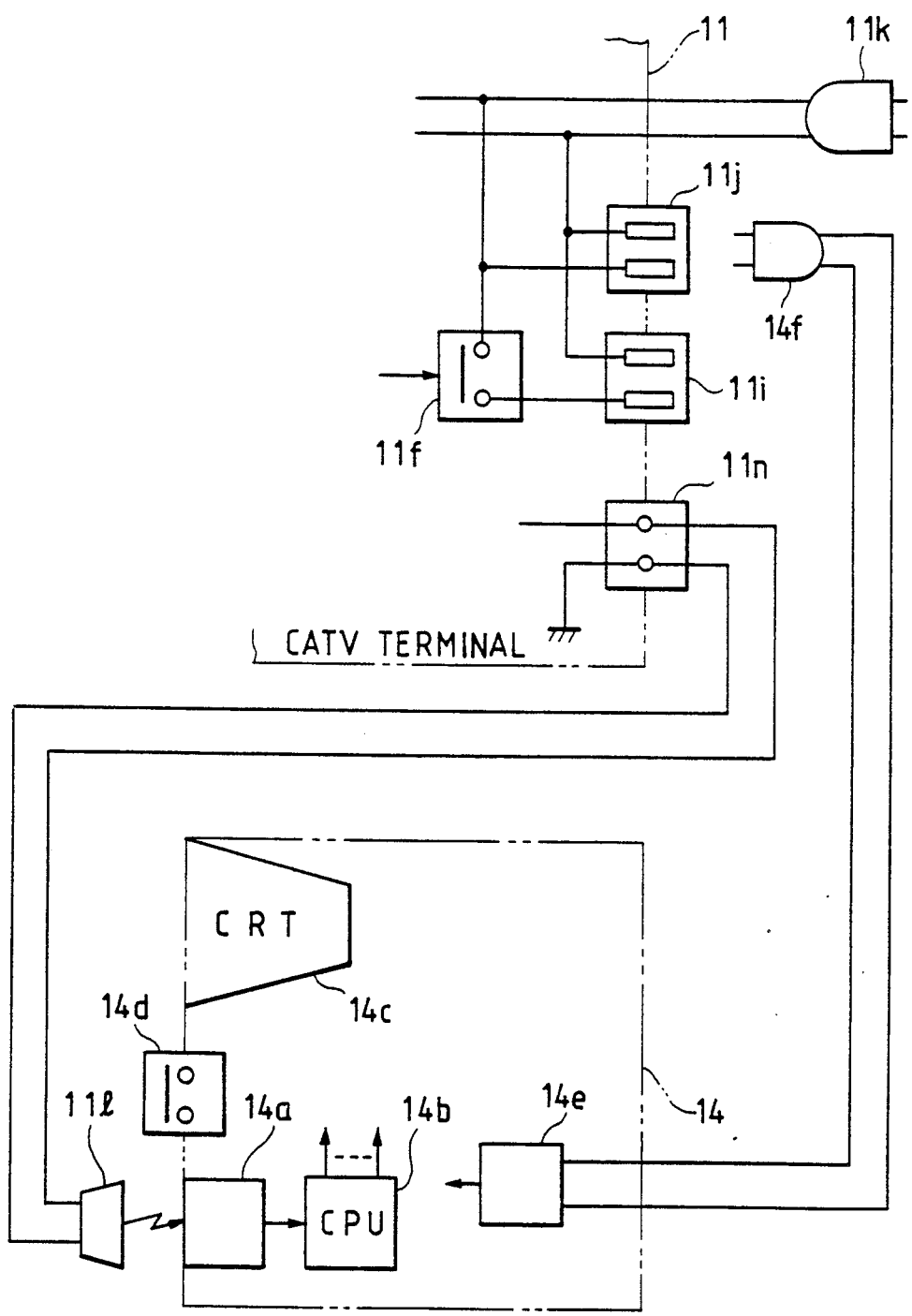
FIG. 4 is a block diagram showing an example of a configuration in the case in which time controlled TV watching is performed by using the CATV terminal depicted in FIG. 1.
Figure 5:
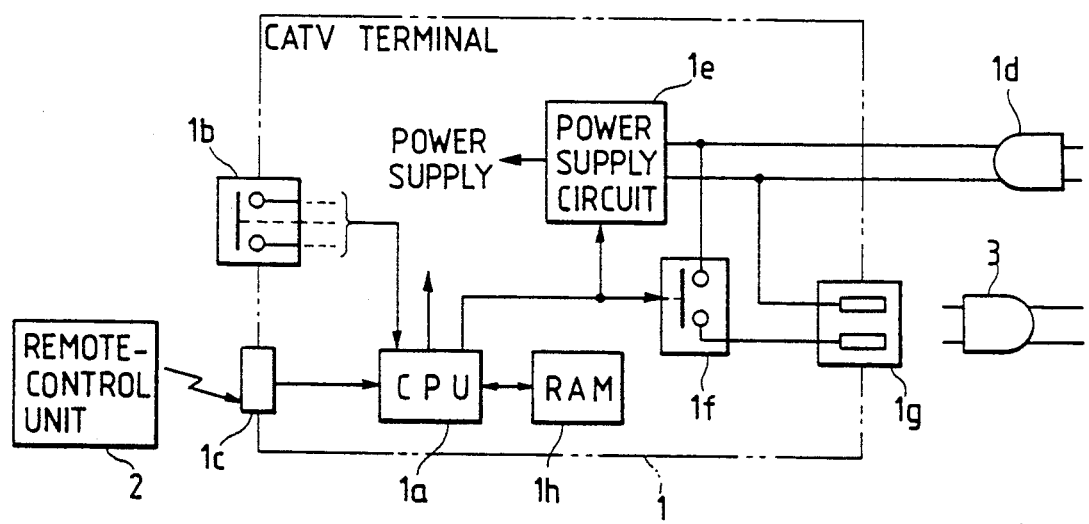
FIG. 5 is a block diagram showing an example of a configuration of a conventional CATV terminal.

Next, in the case where timer-controlled TV watching is to be performed by the use of the CATV terminal configured as described above, the remote-control signal transmitter 11l is fixed by arbitrary means (not shown) such as a sucker so that the transmitter 11l faces the remote-control signal receiving portion 14a of a TV receiver 14 as shown in FIG. 4. The remote-control codes of "POWER ON" and "POWER OFF" necessary for the TV receiver 14 are read from the ROM 11b in response to the operation conducted by the timer function, so that a remote-control signal formed by decoding the thus read remote-control codes is sent out from the CATV terminal 11 to the TV receiver 14 through the remote-control signal transmitter 11l and the remote-control signal receiving element 14a. In the Figure, the reference numeral 14b designates a CPU for performing various kinds of TV receiver control functions, 14c a CRT, 14d a power switch, and 14e a power supply circuit. The AC power for the TV receiver 14 is obtained by connecting the plug 14f into the outlet 11j which supplies a non-switched AC power.

The remote-control codes of "POWER ON" and "POWER OFF" used in TV receivers of a plurality of different types expected to be used in the timer-controlled TV watching process are stored beforehand in the ROM 11b. The individual manufacturers of the plurality of different types of TV receivers supply the appropriate remote-control codes to be stored in ROM 11b. The remote-control codes can thus be read from the ROM 11b and sent out from the remote-control signal transmitter 11l.

Also, the invention is applicable to the case where the ROM 11b has no remote-control codes stored beforehand therein and that, in this case, the RAM 11c may be designed to perform a learning operation to store the necessary remote-control codes based on the remote-control signal sent out from the remote-control unit of the TV receiver used in the timer-controlled TV watching process.

In the aforementioned configuration, the programming of the data required to specify the details of the timer-controlled TV watching process in the CATV terminal 11 is performed by operating the keys of the remote-control unit 12 to designate information, such as the reception channel, the output channel, the date, the ON time, and the OFF time.

Through the aforementioned process, the CATV terminal 11 sends the remote-control code corresponding to the TV receiver function "POWER ON" at the ON time to thereby switch on the power of the TV receiver 14. Thereafter, at the OFF time, the remote-control code corresponding to the TV receiver function "POWER OFF" is sent to the TV receiver 14 to thereby switch off the power of the TV receiver 14. Thus, a series of timer-controlled TV watching operations is finished.

As described above, according to the present invention, the operation of the usable apparatus can be controlled based on the remote-control signal sent out from the CATV terminal without changing the arrangement of the usable apparatus. Therefore, the necessity of setting the timer function of the usable apparatus is eliminated, so that the burdens associated with the unsynchronization of the two separate timer functions are no longer present. Furthermore, according to the invention, the ON/OFF operation of the usable apparatus is not controlled by switching the AC power supplied to the usable apparatus on and off, instead the ON/OFF operation of the usable apparatus is controlled based on its remote-control codes. Accordingly, the problems associated with cutting-off power to the AC power of the usable apparatus, namely, the clearing or initialization of the keyboard-set values, are also eliminated.

What is claimed is:

1. In a CATV terminal having a timer function for turning on a power at a preset date and time and for automatically tuning in to a preset channel to output a reception signal thereon, the improvement characterized in that said CATV terminal further comprises:

a storage means for storing remote-control codes of a usable apparatus which uses said outputted reception signal;

a read-out mean for successively reading said remote-control codes from said storage means in relation to the operation conducted by said timer function; and a remote-control signal transmission means for decoding said remote-control codes read by said read-out mean into a remote-control signal capable of being received by a remote-control signal receiver of said usable apparatus and for sending out said remote-control signal;

wherein said usable apparatus is a VCR and said remote-control code represent channel selection, record, and step commands for said VCR; and wherein said storage means is a ROM programmed to include said remote-control codes for several brands of VCR's.

2. In a CATV terminal having a timer function for turning on a power at a preset data and time and for automatically tuning in to a preset channel to output a reception signal thereon, the improvement characterized in that said CATV terminal further comprises:

a storage means for storing remote-control codes of a usable apparatus which uses said outputted reception signal;

a read-out means for successively reading said remote-control codes from said storage means in relation to the operation conducted by said timer function; and a remote-control signal transmission means for decoding said remote-control codes read by said read-out means into a remote-control signal capable of being received by a remote-control signal receiver of said usable apparatus and for sending out said remote-control signal;

wherein said usable apparatus is a TV receiver and said remote-control code represents monitor turn on and monitor turn off commands for said TV receiver; and wherein said storage means is a ROM programmed to include said remote control codes for several brands of TV receivers.

3. Apparatus as claimed in any of claims 1 or 2, further comprising a CATV remote transmitter for transmitting signals representing CATV turn on, CATV turn off, CATV channel selection, and CATV timer functions including turn on date and time, turn off data and time and channel selection, and remote sensor means in said CATV terminal for responding to said signals from said CATV remote sensor to initiate the commanded operations.

* * * * *